C. C. FARMER.
SAFETY CAR CONTROL EQUIPMENT.
APPLICATION FILED OCT. 15, 1919.
1,390,606.
Patented Sept. 13, 1921.
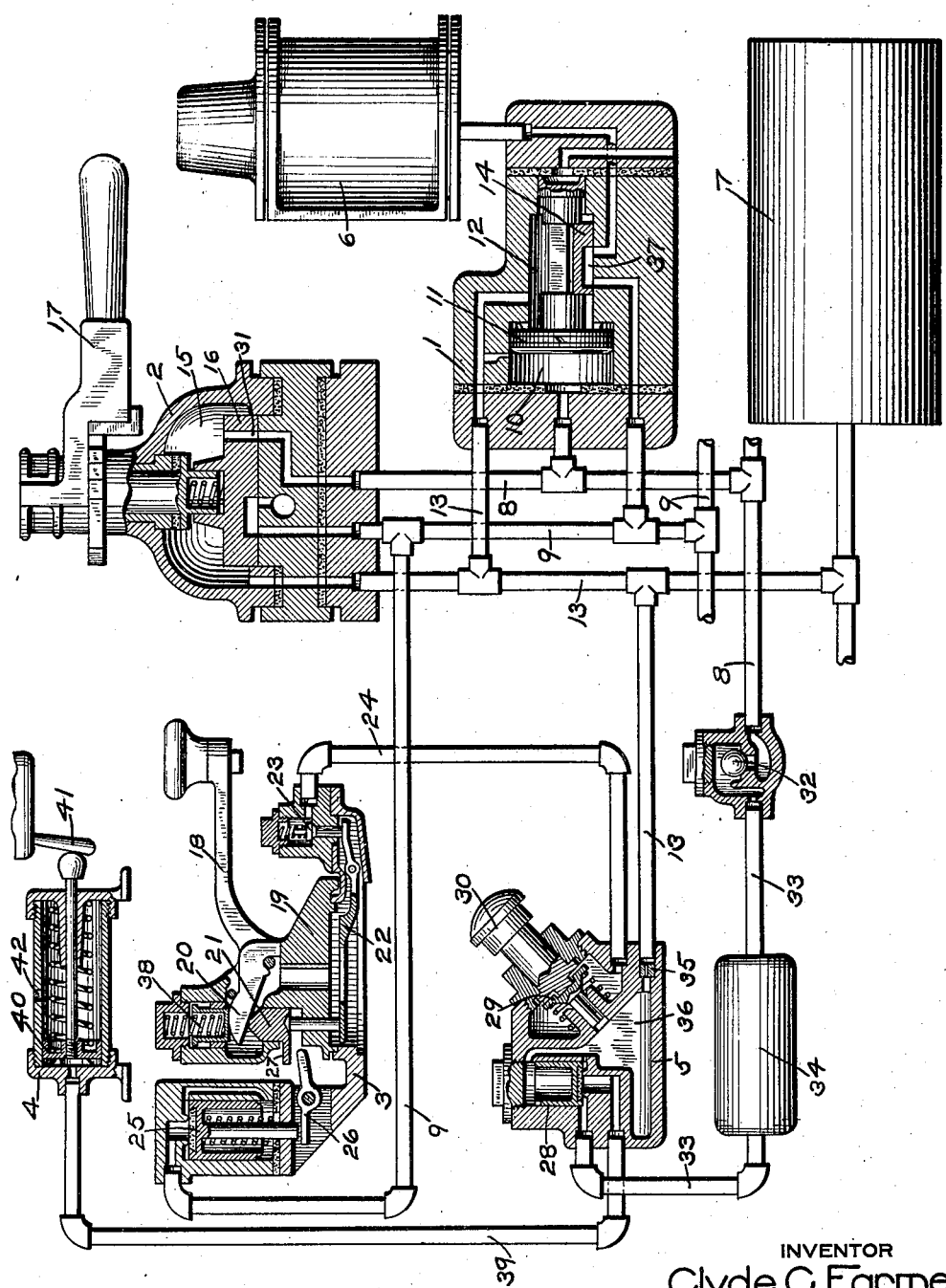
INVENTOR
Clyde C. Farmer
BY
Wm. M. Cady
ATTORNEY

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR-CONTROL EQUIPMENT.

1,390,606.   Specification of Letters Patent.   Patented Sept. 13, 1921.

Application filed October 15, 1919. Serial No. 330,785.

*To all whom it may concern:*

Be it known that I, CLYDE C. FARMER, a citizen of the United States, residing at Pittsburgh, in the county of Allegheny and State of Pennsylvania, have invented new and useful Improvements in Safety Car-Control Equipments, of which the following is a specification.

This invention relates to safety car control equipments, and more particularly to an equipment of the double end type, in which the apparatus may be controlled from either end of the car.

One object of my invention is to provide improved means for preventing an emergency application of the brakes, if the controller handle is released in off position and a straight air application of the brakes has been made, but adapted to permit an emergency application of the brakes under the above conditions, if the controller handle is in an on position.

Another object of the invention is to simplify the construction of a safety car control equipment and reduce the number of pipes required.

Another object of the invention is to provide means for insuring the operation of the safety control features after an ordinary emergency application of the brakes has been made.

In the accompanying drawing, the single figure is a diagrammatic view, principally in section, of a safety car control equipment embodying my invention.

As shown in the drawing, the equipment may comprise a straight air emergency valve device 1, a brake valve 2, a safety controller handle device 3, an automatic power circuit breaking device 4, a foot valve device 5, a brake cylinder 6, a supply reservoir 7, an emergency brake pipe 8, and a straight air pipe 9.

The emergency valve device 1 may comprise a casing having a piston chamber 10 connected to emergency pipe 8 and containing a piston 11, and a valve chamber 12, connected by pipe 13 to reservoir 7, and containing a slide valve 14, adapted to be operated by piston 11.

The brake valve device 2 may comprise a casing having a valve chamber 15, connected to reservoir pipe 13 and containing a rotary valve 16 adapted to be operated by a handle 17.

The safety controller handle device 3 may comprise a handle 18 pivotally mounted on the usual movable controller member 19 and having a finger 20 adapted to engage a pin 21.

The opposite end of pin 21 engages one end of a pivoted lever 22, the other end of which engages a pilot valve 24 adapted to vent fluid under pressure from a safety control pipe 24 for effecting an emergency application of the brakes.

Associated with the controller is a valve piston 25, subject on one side to the pressure in the straight air pipe 9 and adapted to operate a pivotally mounted rocker arm 26, one end of which is adapted when operated to engage a projection 27 carried by the pin 21.

The foot valve device 5 may comprise a casing containing a relay valve 28 and a valve 29 adapted to be operated by a pedal 30 for controlling communication from one side of the relay valve 28 to the safety control pipe 24.

In operation, fluid under pressure is supplied from the reservoir 7 through pipe 13 to the rotary valve chamber 15 of the brake valve device 2 and thence flows through a port 31 in the valve 16 to the emergency brake pipe 8 and to the piston chamber 10.

From the emergency brake pipe 8, fluid flows past a check valve 32 to a pipe 33 having a reservoir 34 interposed therein and communicating with the outer exposed area of the relay valve 28, when said valve is seated.

Fluid also flows from the reservoir pipe 13 through a restricted port 35 to chamber 36 of the foot valve device and thence to one side of the relay valve 28, for normally maintaining said valve in its seated position.

The operator may make a straight air application of the brakes by turning the brake valve handle 17 to straight air application position, in which fluid is supplied to the straight air pipe 9 and thence through cavity 37 in valve 14 to brake cylinder 6, in the usual manner.

An emergency application of the brakes may be made by turning the brake pipe handle 17 to emergency position, in which fluid is vented from the emergency brake pipe 8, to effect the operation of piston 11 and valve 14, so that fluid is supplied from valve chamber 12 and reservoir 7 to the brake cylinder.

If the operator should remove his hand from the controller handle 18 when said handle is in off position and no straight air application of the brakes has been made, a spring 38 operates through handle 18 to depress the pin 21 so as to rock the lever 22 and cause the pilot valve 23 to be opened. Fluid is then vented from the relay valve 28, past valve 29, through pipe 24 and past the valve 23 to the atmosphere, causing the relay valve to open so as to vent fluid from the emergency brake pipe 8 to pipe 39. Piston 40 of the circuit breaker device 4 is then operated to open the power circuit by throwing the circuit breaker switch 41, and when the piston 40 passes over the atmospheric exhaust port 42, fluid is vented from pipe 39 and consequently from emergency brake pipe 8 so as to cause the operation of the emergency valve device 1 to effect an emergency application of the brakes.

If a straight air application of the brakes has been made before the controller handle 18 is released, fluid supplied to the straight air pipe 9 will flow to one side of the valve piston 25 and operate the same so as to depress one end of the rocker arm 26 and cause the other end to engage the projection 27 of pin 21.

Under this condition, when the hand is removed from the controller handle 18, the pin 21 will not be operated by the spring 38 to open the pilot valve 23, so that an emergency application of the brakes will not be effected.

If the controller handle is in an on position, however, and a straight air application of the brakes has been made, the projection 27 being adapted to engage the arm 26 only in the off position, the lever arm 26 will be operated but will not prevent the movement of pin 21 when the controller handle 18 is released, so that in an on position, the apparatus will operate to cut off power and apply the brakes in emergency when the controller handle is released, even if a straight air application of the brakes has been made.

If the operator wishes to use his hands for making change and the like, he can place his foot on the pedal 30 so as to close the valve 29 and thereby cut off communication from the safety control pipe 24, so that when he releases the controller handle 18, the pilot valve will not be effective to cause an emergency application of the brakes and the opening of the power circuit.

It will be noted that the reservoir 34 is charged with fluid under pressure from the emergency brake pipe 8 past the check valve 32, so that if an emergency application of the brakes should be made, by manipulation of the brake valve device 2, by reason of check valve 32, fluid under pressure will still be retained in the reservoir 34.

It will now be seen that if the controller handle 18 should be released after an emergency application of the brakes has been made, there will be sufficient fluid pressure in reservoir 34 to operate the relay valve 28, when the pilot valve 23 is operated by the release of the controller handle 18 to vent fluid from the opposite side of said relay valve.

This is a desirable feature, since the power may be on when an emergency application of the brakes has been made by operation of the brake valve, and when the controller handle is released, the power should be cut off, as the release of the controller handle may be due to the operator becoming incapacitated to control the car or to the fact that he is not properly attending to his duty.

Having now described my invention, what I claim as new, and desire to secure by Letters Patent, is:—

1. In a safety car control equipment, the combination with a controller handle, of a pilot valve, means for normally operating said pilot valve upon release of the controller handle for venting fluid to effect an emergency application of the brakes, a straight air pipe, and means operated by fluid pressure in the straight air pipe for preventing the movement of said pilot valve upon release of the controller handle.

2. In a safety car control equipment, the combination with a controller handle, of a pilot valve, means for normally operating said pilot valve upon release of the controller handle for venting fluid to effect an emergency application of the brakes, a straight air pipe, and means operated by fluid pressure in the straight air pipe and effective only in the off position of the controller handle for preventing the movement of said pilot valve when the controller handle is released.

3. In a safety car control equipment, the combination with a controller handle, of a relay valve for effecting an emergency application of the brakes, a pilot valve for effecting the operation of said relay valve, means operated upon release of the controller handle in an on position for opening said pilot valve, and a device operated upon effecting a straight air application of the brakes for preventing the operation of said means when the controller handle is released in the off position.

4. In a safety car control equipment, the combination with a controller handle, of a relay valve for effecting the opening of the power circuit, a pilot valve for effecting the operation of said relay valve, means operated upon release of the controller handle in a power on position for opening said pilot valve, and mechanism operated upon effecting a straight air application of the brakes for preventing the operation of said means when the controller handle is released in the power off position.

5. In a safety car control equipment, the combination with a controller handle, a pilot valve, and means for normally operating said pilot valve and operated upon release of the controller handle, of an emergency brake pipe, a relay valve controlled by said pilot valve for venting fluid from the emergency brake pipe, and a check valve for preventing back flow from the relay valve to the emergency brake pipe.

6. In a safety car control equipment, the combination with a controller handle, a pilot valve, and means for normally operating said pilot valve and operated upon release of the controller handle, of an emergency brake pipe, a relay valve controlled by said pilot valve for venting fluid from the emergency brake pipe, a reservoir through which fluid flows from the emergency brake pipe to the relay valve, and a check valve for preventing back flow from the reservoir to the emergency brake pipe.

7. In a safety car control equipment, the combination with a controller handle, a pilot valve, and means for normally operating said pilot valve and operated upon release of the controller handle, of means operated by fluid under pressure for effecting the opening of the power circuit, an emergency brake pipe, a reduction in pressure in which effects an emergency application of the brakes, a a relay valve controlled by said pilot valve for venting fluid from the emergency brake pipe to said means, a reservoir, through which fluid flows from the emergency brake pipe to the relay valve, and a check valve for preventing back flow from the reservoir to the emergency brake pipe.

8. In a safety car control equipment, the combination with a controller handle and means including a relay valve operated upon release of the controller handle for effecting an emergency application of the brakes, of a valve device adapted to be operated by the foot for preventing an emergency application of the brakes upon release of the controller handle, said valve device having the relay valve incorporated therein.

In testimony whereof I have hereunto set my hand.

CLYDE C. FARMER.